United States Patent [19]

Wetegrove et al.

[11] Patent Number: 4,786,679
[45] Date of Patent: * Nov. 22, 1988

[54] WATER-IN-OIL EMULSIONS OF AMIDASE

[75] Inventors: Robert L. Wetegrove, Winfield; Ralph W. Kaesler, Barrington; Bhupati Bhattacharyya, Downers Grove, all of Ill.

[73] Assignee: Nalco Chemical Company, Naperville, Ill.

[ * ] Notice: The portion of the term of this patent subsequent to Aug. 18, 2004 has been disclaimed.

[21] Appl. No.: 14,328

[22] Filed: Feb. 13, 1987

[51] Int. Cl.⁴ .............................. C08J 9/04
[52] U.S. Cl. ................... 524/827; 526/199; 528/492; 435/228; 435/262; 252/308; 252/312
[58] Field of Search ........ 524/827; 526/199; 528/492; 435/228, 262; 252/308, 312

[56] References Cited

U.S. PATENT DOCUMENTS

| | | |
|---|---|---|
| Re. 28,474 | 12/1983 | Anderson et al. . |
| Re. 28,576 | 12/1983 | Anderson et al. . |
| 3,284,393 | 11/1966 | Vanderhoff et al. . |
| 3,288,770 | 11/1966 | Butler . |
| 3,624,019 | 11/1971 | Anderson et al. . |
| 3,734,873 | 5/1973 | Anderson et al. . |
| 3,826,771 | 7/1974 | Anderson et al. . |
| 3,897,308 | 7/1975 | Li et al. .............. 435/188 |
| 3,915,920 | 10/1975 | Slovinsky et al. . |
| 3,920,599 | 11/1975 | Hurlock et al. . |
| 3,979,348 | 9/1976 | Ballwebber et al. . |
| 3,996,180 | 12/1976 | Kane . |
| 3,997,492 | 12/1976 | Kane et al. . |
| 4,024,097 | 5/1977 | Slovinsky et al. . |
| 4,375,529 | 3/1983 | Fong et al. . |

FOREIGN PATENT DOCUMENTS

| | | |
|---|---|---|
| 0008213 | 8/1979 | European Pat. Off. . |
| 53-086078 | 7/1978 | Japan . |

OTHER PUBLICATIONS

Search Report, Kirk–Othmer, vol. 5, pp. 735–762.

*Primary Examiner*—Joseph L. Schofer
*Assistant Examiner*—Peter D. Mulcahy
*Attorney, Agent, or Firm*—John G. Premo; Anthony L. Cupoli; Donald G. Epple

[57] ABSTRACT

A water-in-oil emulsion, the aqueous phase of which contains Amidase. An improved method of treating water-in-oil emulsions of acrylamide polymers with Amidase to reduce the acrylamide content thereof which comprises adding the Amidase in the form of a water-in-oil emulsion.

2 Claims, No Drawings

WATER-IN-OIL EMULSIONS OF AMIDASE

INTRODUCTION

When acrylamide is polymerized with itself or with other water-soluble vinyl monomers, water-soluble polymers result. These polymers contain, in addition to starting ingredients or decomposition products thereof, amounts of acrylamide which can be as high as 400 ppm depending upon a concentration of the polymer and its method of production. An important variable is, of course, the amount of starting acrylamide used to produce the polymer.

An important polymerization technique for producing acrylamide polymers resides in the so-called inverse emulsion polymerization technique which is described in detail in U.S. Pat. Nos. 3,284,393 and Re. 28,474. These patents and their disclosures are incorporated herein by reference.

In its broadest aspect, this inverse polymerization process utilizes a water-in-oil emulsion polymerization process in which a water-soluble monomer is emulsified in an oil phase and is polymerized therein. More specifically, in the case of acrylamide polymers, acrylamide or acrylamide with other water-soluble monomers are formed into a water-in-oil emulsion by means of a water-in-oil emulsifing agent. This emulsion also contains a free radical polymerization catalyst capable of forming free radicals. This mixture is then subjected to polymerization conditions as described in the above mentioned patents.

At the end of the polymerization, the polymer may be separated from the emulsion or the emulsion can be treated before, during, or after polymerization with a water-soluble surfactant. When the water-in-oil emulsion containing the water-soluble surfactant is added to water, it rapidly inverts, thus causing rapid dissolution of the polymer. This is described in detail in Re. 28,474.

THE WATER-IN-OIL EMULSIONS OF WATER-SOLUBLE ACRYLIC ACID POLYMERS

The water-in-oil emulsions of the acrylamide polymers useful in this invention contain four basic components. These components and their weight percentages in the emulsions are listed below:
  A. The acrylamide polymer:
    1. Generally from 5–60%;
    2. Preferably from 20–40%; and
    3. Most preferably from 25–35%;
  B. Water:
    1. Generally from 20–90%;
    2. Preferably from 20–70%; and
    3. Most preferably from 30–55%;
  C. Hydrophobic liquid:
    1. Generally from 5–75%;
    2. Preferably from 5–40%; and
    3. Most preferably from 20–30%; and
  D. Water-in-oil emulsifying agent:
    1. Generally from 0.1–20%;
    2. Preferably from 1–15%;
    3. Most preferably from 1.2–10%.

It is also possible to further characterize the water-in-oil emulsions of the acrylamide polymers with respect to the aqueous phase of the emulsions. This aqueous phase is generally defined as the sum of the acrylamide polymer or copolymer present in the emulsion plus the amount of water present in the emulsion. This terminology may also be utilized in describing the water-in-oil emulsions which are useful in this invention. Utilizing this terminology, the aqueous phase of the water-in-oil emulsions of this invention generally consists of 25–95% by weight of the emulsion. Preferably, the aqueous phase is between 60–90% and most preferably from 65–85% by weight of the emulsion.

The emulsions also may be characterized in relation to the water/oil ratios. This figure is simply a ratio of the amount of water present in the emulsion divided by the amount of hydrophobic liquid present in the emulsion. Generally, the water-in-oil emulsions of this invention will have a water/oil ratio of from 0.25 to 18. Preferably, the water-in-oil ratio will range from 0.5–14, and most preferably from 1.0–2.75.

Acrylamide Polymers

The term acrylamide polymer as used herein includes not only homopolymers or acrylamide but also copolymers of acrylamide which contain 5% or more acrylamide units.

Cationic Acrylamide Polymers

The acrylamide polymer contained in the water-in-oil emulsions utilized in this invention are polymers and copolymers of cationic or cationically modified acrylamide polymers. Polymers of this type include copolymers of acrylamide and dimethyl amino ethyl methacrylate and its water-soluble quaternary derivatives, poly dimethyl amino ethyl methacrylate and its water soluble quaternary derivatives and polymers and copolymers of diallyl dimethyl ammonium chloride such as that described in U.S. Pat. No. 3,288,770 and further described in water-in-oil emulsion form in U.S. Pat. No. 3,920,599. Other cationically modified polymers suitable for use in the water-in-oil emulsions of this invention include polyacrylamides which have been subjected to the mannich reaction and their corresponding water-soluble quaternary derivatives. Polymers of this type are described in U.S. Pat. No. 3,979,348.

Anionic Acrylamide Polymers

Anionic acrylamide polymers include acrylamide polymerized with acrylic acid, 2-acrylamido, 2-methyl propane sulfonic acid, and related sulphonate monomers, maleic, fumaric and itaconic acids, styrene sulphonates and the like.

The Hydrophobic Liquids

The hydrophobic liquids or oils used in preparing these emulsions may be selected from a large group of organic liquids which include liquid hydrocarbons and substituted liquid hydrocarbons.

A preferred group of organic liquids that can be utilized in the practice of this invention are paraffinic hydrocarbon oils. Examples of these types of materials include a branch-chain isoparaffinic solvent sold by Humble Oil and Refinery Company under the tradename "Isopar M" described in U.S. Pat. No. 3,624,019 and a paraffinic solvent sold by the Exxon Company, U.S.A. called "Low Odor Paraffinic Solvent", (i.e. LOPS). Typical specifications of this material are set forth below in Table I.

TABLE I

| | |
|---|---|
| Specific Gravity 60°/60° F. | 0.780–0.806 |
| Color, Saybolt | +30 min. |
| Appearance, visual | Bright and Clear |
| Aniline Point, °F., ASTM D-611 | 160 min. |

TABLE I-continued

| Distillation, °F., ASTM D-86 | |
|---|---|
| IBP | 365 min. |
| FBP | 505 max. |
| Flash Point, °F., TCC | 140 min. |
| Sulfur, ppm, Microcoulometer | 15 max. |

While paraffinic oils are the preferred materials for use in preparing the water-in-oil emulsions of this invention, other organic liquids can be utilized. Thus, mineral oils, kerosenes, naphthas, and in certain instances petroleum may be used. While useful in this invention, solvents such as benzene, xylene, toluene, and other water immiscible hydrocarbons having low flash points or toxic properties are generally avoided due to problems associated with their handling.

The Water-In-Oil Emulsifying Agents

Any conventional water-in-oil emulsifying agent can be used such as sorbitan monostearate, sorbitan monooleate, and the so-called low HLB materials which are all documented in the literature and are summarized in the Atlas HLB Surfactants Selector. Although the mentioned emulsifiers are used in producing good water-in-oil emulsions, other surfactants may be used as long as they are capable of producing these emulsions. It is also contemplated, however, that other water-in-oil emulsifying agents can be utilized.

U.S. Pat. No. 3,997,492 shows the use of emulsifiers generally having higher HLB values to produce stable emulsions similar in character to those discussed above. With the use of the equations present in this reference, which is hereinafter incorporated by reference, emulsifiers having HLB values between 4-9 can be utilized in the practice of this invention.

In addition to the reference described above, U.S. Pat. No. 4,024,097 discloses particular emulsifying agents for the water-in-oil emulsions, which are the subject of this invention. These emulsions are generally prepared according to this reference utilizing a water-in-oil emulsifying agent comprising a partially esterified lower N,N-dialkanol substituted fatty amide. Additionally, other surfactants may be combined to produce emulsions having small particle sizes and excellent storage stability.

The Preparation of the Water-In-Oil Emulsions of Acrylamide Polymers

The general method for the preparation of emulsions of the type described above is contained in Vanderhoff, U.S. Pat. No. 3,284,393. A typical procedure for preparing acrylamide polymer emulsions of this type includes preparing an aqueous solution of acrylamide monomer and adding this solution to one of the hydrocarbon oils described above. With the addition of a suitable water-in-oil emulsifying agent and under agitation, the emulsion is then subjected to free radical polymerization conditions and a water-in-oil emulsion of the the acrylamide polymer is obtained. It should be pointed out that the ingredients are chosen based upon the weight percentages given above and their compatability with each other. As to choice of free radical catalyst, these materials may be either oil or water-soluble and may be from the group consisting of organic peroxides, Vazo type materials, redox type initiator systems, etc. Additionally, ultraviolet light, microwaves, etc. will also cause the polymerization of water-in-oil emulsions of this type.

The manufacture of emulsions of this type, which are further detailed in U.S. Pat. Nos. 3,624,019, Re. 28,474, 3,734,873, Re. 28,576, 3,826,771, all of which are hereby incorporated by reference. The use of air may be employed to control polymerization. This technique is described in U.S. Pat. No. 3,767,629 which is also hereby incorporated by reference.

In addition to the above references, U.S. Pat. No. 3,996,180 describes the preparation of water-in-oil emulsions of the types utilized in this invention by first forming an emulsion containing small particle size droplets between the oil, water, monomer and water-in-oil emulsifying agent utilizing a high shear mixing technique followed by subjecting this emulsion to free radical polymerization conditions. Also of interest is U.S. Pat. No. 4,024,097 which describes water-in-oil emulsions such as those described above utilizing particular surfactant systems for the water-in-oil emulsifying agent, allowing for the preparation of latexes having small polymer particle sizes and improved storage stability.

Another reference, U.S. Pat. No. 3,915,920, discloses stabilizing water-in-oil emulsions of the type above described utilizing various oil-soluble polymers such as polyisobutylene. Employment of techniques of this type provides for superior stabilized emulsions.

Of still further interest is U.S. Pat. No. 3,997,492 which describes the formation of water-in-oil emulsions of the type above described.

After the polymerization is completed and the emulsion is still in the reactor, it is sometimes the practice, as a final step, to subject the finished emulsion to a so-called post-heat step using temperatures ranging between 45° to 80° C. until a satisfactory acrylamide monomer level is achieved for a period of time ranging between 1-24 hours will suffice. This step tends to polymerize a portion of the acrylamide monomer present in the system. It does not effectively reduce the acrylamide monomer content of the system completely. Also at the end of the reaction, it is useful sometimes to sparge the reaction which also tends to retard the deleterious oxidation of certain moieties remaining in the system. Also at this point, it is sometimes beneficial to adjust the pH and add a water-soluble surfactant inverting agent.

It is possible to concentrate the emulsions after polymerization is complete by removing the water therefrom. Such a procedure is disclosed in European Patent Publication No. 0 008 213, the disclosure of which is incorporated herein by reference.

Physical Properties of The Water-In-Oil Emulsions

The water-in-oil emulsions of the finely divided the acrylamide polymers useful in this invention contain relatively large amounts of polymer. The polymers dispersed in the emulsion are quite stable when the particle size of the polymer is from the range of 0.1 microns up to about 5 microns. The preferred particle size is generally within the range of 0.2 microns to about 3 microns. A most preferred particle size is generally within the range of 0.2 to 2.0 microns.

The emulsions prepared having the above compositions generally have a viscosity in the range of from 50 to 1,000 cps (based on Brookfield viscometer). It will be seen, however, that the viscosity of these emulsions can be affected greatly by increasing or decreasing the polymer content, oil content, or water content as well as the choice of a suitable water-in-oil emulsifier.

Another factor attributing to the viscosity of these types of emulsions is the particle size of the polymer which is dispersed in the discontinued aqueous phase. Generally, the smaller the particle obtained the less viscous the emulsion. At any rate, it will be readily apparent to those skilled in the art as to how the viscosity of these types of materials can be altered. It is important tht the emulsion be somewhat fluid, i.e. pumpable.

The emulsions at the end of the polymerization process described above, can contain acrylamide monomer content ranging between 50 to 4000 ppm, although generally the acrylamide monomer content will be within the range of 500–1000 ppm.

Recently in the literature a number of patent documents and literature references have indicated that it is possible to treat acrylamide polymer solutions with the enzyme, Amidase, which selectively reacts with the acrylamide monomer so as to degrade acrylamide to acrylic acid and other less toxic by products.

While Amidase in a semi-purified or purified form has been shown to effectively convert acrylamide monomers present in acrylamide polymer solutions, it has not been suggested in the literature to utilize these enzymes or their precursor bacteria to treat the water-in-oil emulsions of acrylamide polymers of the type described above.

In our earlier experiments using aqueous solutions or suspensions of Amidase, Amidase-containting bacteria or crude Amidase, it was discovered that unless these solutions or suspensions were very carefully added to the acrylamide-containing water-in-oil emulsions, that inversion began to occur which is evidenced by a thickening by the concentrated emulsion which produces a partially inverted emulsion system that is not suitable for commercial use.

THE INVENTION

The invention comprises an improved method of treating water-in-oil emulsions of acrylamide polymers with Amidase to reduce the acrylamide content thereof which comprises adding the Amidase to said emulsions in the form of a water-in-oil emulsion. In another embodiment of the invention, the invention is concerned with a water-in-oil emulsion, the aqueous phase of which contains Amidase. The Amidase of this invention is specific to acrylamide monomer and does not appear to affect acrylamide polymer.

The Amidase Species

The Amidase may be derived from a broad spectrum of bacterial species. While it is not possible to list all of the species, illustrative are the:

1. *Brevibacterium ammoniagenes*
2. Mixed culture of Brevibacterium and Bacillus
3. Individual cultures of Bacillus and Pseudomonas
4. Specific Brevibacterium species such as *Brevibacterium acetylicum, Brevibacterium helvolum, Brevibacterium leucinophagum, Brevibacterium linens,* and *Brevibacterium vitarumen.*
5. Rhodococcus species
6. Certain Arthrobacter species
7. *Pseudomonas chloroaphis*

Using known methods of producing enzymes from bacterium cell material, it is possible to produce a crude Amidase from species of the type illustrated above and then to subject such impure Amidase to further purification to produce a substantially pure Amidase.

Using known methods of producing enzymes from bacterium cell material, it is possible to produce a crude Amidase from species of the type illustrated above and then to subject such impure Amidase to further purification to produce a substantially pure Amidase.

One method for producing enzymes from bacterium and cell material is disclosed in Japanese patent No. 53086078. There, the intracellular enzymes of *brevibacterium ammoniagenes* was prepared as follows:

The seed strain of the *brevibacterium ammoniagenes* was cultured at 25°–35° C. at a pH falling within the range of 6.5 to 8.5 in a liquid culture medium containing a carbon source, a nitrogen source, inorganic salts and other nutrients. After cultivation, the bacterial body was separated by filtration and worked up by standard techniques. The crude enzyme was obtained by drying the bacterial body by the acetone powder method or by freeze-drying and breaking the bacterial cells by mashing in buffer solution or by subjection to supersonic waves.

Throughout the specification and claims, we have used the term 'Amidase' which we intend to include pure, semi-pure as well as bacterial cells containing Amidase, all of which may be used in the practice of my invention.

Generally, the Amidase in terms of pure Amidase will be made up into solutions or suspension, although a powder can be used.

Amidase prepared from the bacterium cell material is characterized in terms of its activity. The activity varies due to other matter found in the bacterium. Generally, however, activity between 1 and 100 micro moles/minute per mililiter at 30° C. is desirably obtained. However, activity outside of these ranges are utilizable and may be obtained using other techniques. Activity for purpose of this application refers to catalytic activity of the Amidase, and is determined by standard methods.

Dosage of Amidase will be characterized in terms of enzyme units, which are defined to be that amount of enzyme which will catalyze the formation of one micro mole of ammonia per minute from a 25 millimolar solution of acrylamide at pH 6.0 and 30° C.

The amount of Amidase used to treat the emulsions will vary depending upon the amount of acrylamide monomer present therein and upon the activity of the Amidase. Assuming an Amidase activity of 50 to 100 units/ml (at 30° C.), a dosage of 10 ml/Kg polymer or less of Amidase will give adequate results in reducing the acrylamide monomer content.

Although more than 1000 units/Kg of Amidase can be utilized for this system, it is not necessary as the Amidase is acting as a catalyst. Although this is true, there is an expected lower dosage limit for the Amidase due to deactivation effects. It is expected that at least 300 units/Kg should be effective. Generally, the Amidase is effective for any concentration of acrylamide monomer. However, for purposes of providing some quantitative guidelines, we feel that generally 50 to 1000 units of Amidase should be utilized per 1000 grams of emulsion. As a general rule, the emulsion will contain 1000 ppm or less of acrylamide monomer. We believe, that this amount of Amidase will be effective with higher amounts of acrylamide monomer and know that it will be effective with lesser concentrations of acrylamide monomer.

To prepare the Amidase-containing emulsion, it is normal to prepare the Amidase either as a form of an aqueous suspension or solution. Such suspensions or solutions should be relatively concentrated, e.g. 0.1% up to the saturation solubility of the Amidase. Generally, the Amidase solution used to prepare the solutions will contain 0.1–10% by weight. This aqueous solution or suspension of the Amidase comprises the subsequent formed aqueous phase of the emulsion. It is generally 25–95% by weight, preferably 60–90% by weight and more preferably 65–85% by weight. The oil phase (i.e. hydrophilic liquid phase) is generally from 5–75% by weight, preferably 5–45% by weight and most preferabley 20–30% by weight.

The hydrophilic liquid as well as the particular water-in-oil emulsifier should generally contain the hydrocarbon liquid or emulsifier present in the polymer emulsions which would be treated with the Amidase emulsion.

The Amidase emulsions described are generally added to the acrylamide polymer emulsions after the polymerization is complete. Depending upon the particular treatment employed as described above, the potency of the Amidase, its concentration, and type of emulsion, it is usually possible to reduce the acrylamide monomer content of the above described emulsion to less than 10 ppm over a period of time ranging between ½–24 hours.

We have found that the addition of Amidase in emulsion form to the latex is superior to adding the Amidase in solution form. When Amidase solution is added to an acrylamide latex, there are appreciably more gel particles formed in latex than we have found when Amidase emulsion is added.

In practice the latex pH should be within the range of 4.5 to 8.5 and preferably within the range of 5 to 7.5 in order to optimize Amidase activity.

Amidase activity can also be enhanced by temperature adjustment. Generally, the higher the temperature the quicker the reduction of acrylamide monomer. However, as temperatures increase above 60° C. temperature deactivation of Amidase should be taken into account.

In order to minimize destabilization of the polymer latex to be treated, it is best to form the Amidase emulsion as similar a make up to the latex as possible. Thus, the hydrophobic liquid and the water-in-oil emulsifier agents ideally would be the same for both the polymer latex and the Amidase latex. In addition, the same relative percentages of water, hydrophobic liquid and water-in-oil emulsifying agents should be obtained for both systems. However, it is not a necessity to have such similarity. The Amidase emulsion can be prepared with a different hydrophobic liquid or a different water-in-oil emulsifier agent than the polymer latex.

To illustrate the Amidase emulsions and their use in treating acrylamide polymer water-in-oil emulsions, the following are presented by way of example:

EXAMPLE 1

Within the use of Amidase prepared from Brevibacterium as outlined in discussion above of Japanese Patent No. 53086078, a typical procedure for Amidase treatment of latex would involve adding sufficient Amidase having sufficient activity to effectuate reductiion of initial acrylamide level to less than 10 ppm within the desired time. Although the stirring rate should be selected to provide thorough contact of the Amidase with acrylamide monomers for purposes of this example, the Amidase is added dropwise to 100 grams of a stirred latex. Stirring at a rate of approximately 100 rpm is contemplated and for this example can be effectuated in a common round bottom flask or other suitable vessel. Aliquots of latex may be taken at timed intervals and the emulsion inverted in water to provide 1 to 2% solutions, which should then be analyzed for the acrylamide monomer content at the time interval at which the aliquot was taken.

EXAMPLE 2

The water-in-oil emulsion of Amidase is prepared as follows: 1 gram of Amidase is dissolved in 1 gram of water and emulsified with 4.7 grams LOPS and 0.135 grams Span 80.

The Amidase emulsion is added to 100 grams of a polyacrylamide latex having an RSV of 6–8, 30% acrylamide by weight, and a pH of 7.0 at 25° C. The polyacrylamide latex initially contains 100 ppm acrylamide monomer. After addition of the Amidase, the temperature is raised to 45° C. At the end of 24 hours, less than 8 ppm of acrylamide monomer remain.

EXAMPLE 3

Amidase emulsion having 1000 units of Amidase per kilogram of latex polymer is prepared. This Amidase is added to a polymer latex. The polymer latex had a pH of 8.35 and was maintained at a temperature of 60° C. and had an initial acrylamide monomer content of 360 ppm. At the end of 2 hours approximatey 90 ppm acrylamide remains. The acrylamide is reduced to less than 10 ppm at the end of 10 hours. 0.46 grams of gel are formed per kilogram of latex polymer.

EXAMPLE 4

An Amidase solution is prepared having 1000 units of Amidase per kilogram of latex polymer having a pH of 8.35, the latex polymer having the make-up of the previous example is dosed. At the end of 2 hours, 170 ppm acrylamide monomer remains; at the end of 10 hours about 15 ppm acrylamide monomer remains. Aproximately 1.63 grams of gel per kilogram of latex is produced.

Having thus described our invention, we claim:

1. A water-in-oil emulsion comprising a mixture of Amidase, and an acrylamide containing polymer.

2. The water-in-oil emulsion of claim 1 further including acrylamide.

* * * * *